United States Patent [19]
Wang

[11] Patent Number: 5,619,673
[45] Date of Patent: Apr. 8, 1997

[54] VIRTUAL ACCESS CACHE PROTECTION BITS HANDLING METHOD AND APPARATUS

[75] Inventor: Wen-Hann Wang, Portland, Oreg.

[73] Assignee: Intel Corporation, Santa Clara, Calif.

[21] Appl. No.: 610,802

[22] Filed: Mar. 7, 1996

Related U.S. Application Data

[63] Continuation of Ser. No. 268,222, Jun. 29, 1994, abandoned.

[51] Int. Cl.$^6$ .................................................. G06F 12/14
[52] U.S. Cl. ................ 395/417; 364/243.41; 364/246.6; 364/246.3; 364/DIG. 1; 395/472; 395/800
[58] Field of Search ................................. 395/800, 472, 395/483, 417

[56] References Cited

U.S. PATENT DOCUMENTS

| | | | |
|---|---|---|---|
| 4,658,356 | 4/1987 | Shiozaki | 395/417 |
| 4,890,223 | 12/1989 | Cruess | 395/400 |
| 5,247,648 | 9/1993 | Watkins | 395/425 |
| 5,263,142 | 11/1993 | Watkins | 395/425 |
| 5,265,227 | 11/1993 | Kohn | 395/400 |
| 5,307,477 | 4/1994 | Taylor | 395/425 |
| 5,418,927 | 5/1995 | Chang | 395/425 |
| 5,450,563 | 9/1995 | Gregor | 395/403 |

*Primary Examiner*—Eric Coleman
*Attorney, Agent, or Firm*—Blakely, Sokoloff, Taylor & Zafman

[57] ABSTRACT

A protection update buffer in conjunction with a cache memory that stores data, protection information and data line tags. The protection update buffer also stores cache address tags. By storing cache tags in the protection update buffer, the protection update buffer may alert the cache memory of lines that have had protection bits change. Also, by further storing data protection information in the protection update buffer, it is possible for the protection update buffer to provide correct protection information for cached data. If writing a tag and/or data protection information to the protection update buffer causes an overflow of the protection update buffer, then the associated cache is flushed and the entries of the protection update buffer are cleared.

15 Claims, 5 Drawing Sheets

VIRTUAL ACCESS CACHE PROTECTION BITS HANDLING METHOD AND APPARATUS

This is a continuation of application Ser. No. 08/268,222, filed Jun. 29, 1994, now abandoned.

FIELD OF INVENTION

The present invention relates to computers and, more particularly, to methods and apparatus for handling page protection information changes in a cache memory subsystem.

BACKGROUND OF THE INVENTION

Computers address physical memory to obtain both program instructions and data. Physical memory inturn provides data and program instructions to the processing unit of a computer. Physical memory space is limited in size to the physical memory size of the hardware within the computer.

In order to develop a computer with a memory space larger than the physical memory space, many computers utilize the concept of a virtual memory space. Typically, a virtual memory space is several orders of magnitude larger than the actual physical memory size. Most computers with a virtual memory space are operated by translating virtual memory addresses to physical memory addresses.

Cache memory subsystems improve the performance of computer systems. Traditionally, cache memory subsystems are physical memory address based. Some computers have virtual address caches. A speed advantage in using a virtual address cache memory subsystem exists. For virtual address caches, the speed advantage arises from the fact that the cache look-up may begin before completing a virtual-to-physical memory address translation.

Although virtual address caches have an inherent speed advantage over physical address caches, the complexities of virtual address caches limit their application. For example, one problem with virtual address caches relates to maintaining correct data protection information for cached data. Data protection information is usually defined for a page or segment of memory and includes such items as read privileges, write privileges, execution privileges over multiple privilege levels, and data ownership. Caches (virtual and physically addressed) are structured with lines, and usually cache lines have a different organization than the page or segment organization. Therefore, developing schemes by which virtual address caches are updated for protection information changes has challenged computer designers.

One prior art approach to handling protection information changes with a computer system containing a virtual address cache relies on dedicated hardware which sequentially checks all the cache tag addresses and invalidates cache lines which correspond to data that has had a protection change. Typically, protection bits are associated with an entire page or segment of memory. Therefore, more than one cache line may need to be invalidated if a page's or segment's protection bits change. This checking process necessitates additional hardware, and prior art approaches lock out program execution cache addressing while the checking of the tags commences, resulting in a performance penalty.

SUMMARY OF THE INVENTION

It is, therefore, an object of the present invention to provide a mechanism within a virtual address cache which handles protection information changes and improves the overall program execution speed of a computer over prior art approaches. In conjunction with this objective, a cache of the present invention handles protection information changes while minimizing the locking out of cache tag addressing. The invention, in one embodiment, also updates protection information, rather than invalidating cached entries to enhance computer performance.

Another object of the present invention is to reduce the size and complexities of the required hardware for handling protection information changes in a virtual address cache.

These and other objects of the present invention are realized in a circuit and a method of operation for a cache. The circuit is referred to in the present application as a "Protection Update Buffer" (PUB). Its inclusion with a cache modifies the method of operation of the cache.

The features and methods of operating a virtual address cache including a PUB will be better understood by reference to the detailed description and drawings which follow.

BRIEF DESCRIPTION OF DRAWINGS

The present invention will be understood more fully from the detailed description given below and from the accompanying drawings, which, however, should not be taken to limit the invention to any specific embodiment, but are for explanation and understanding only.

DETAILED DESCRIPTION

Figure 1:
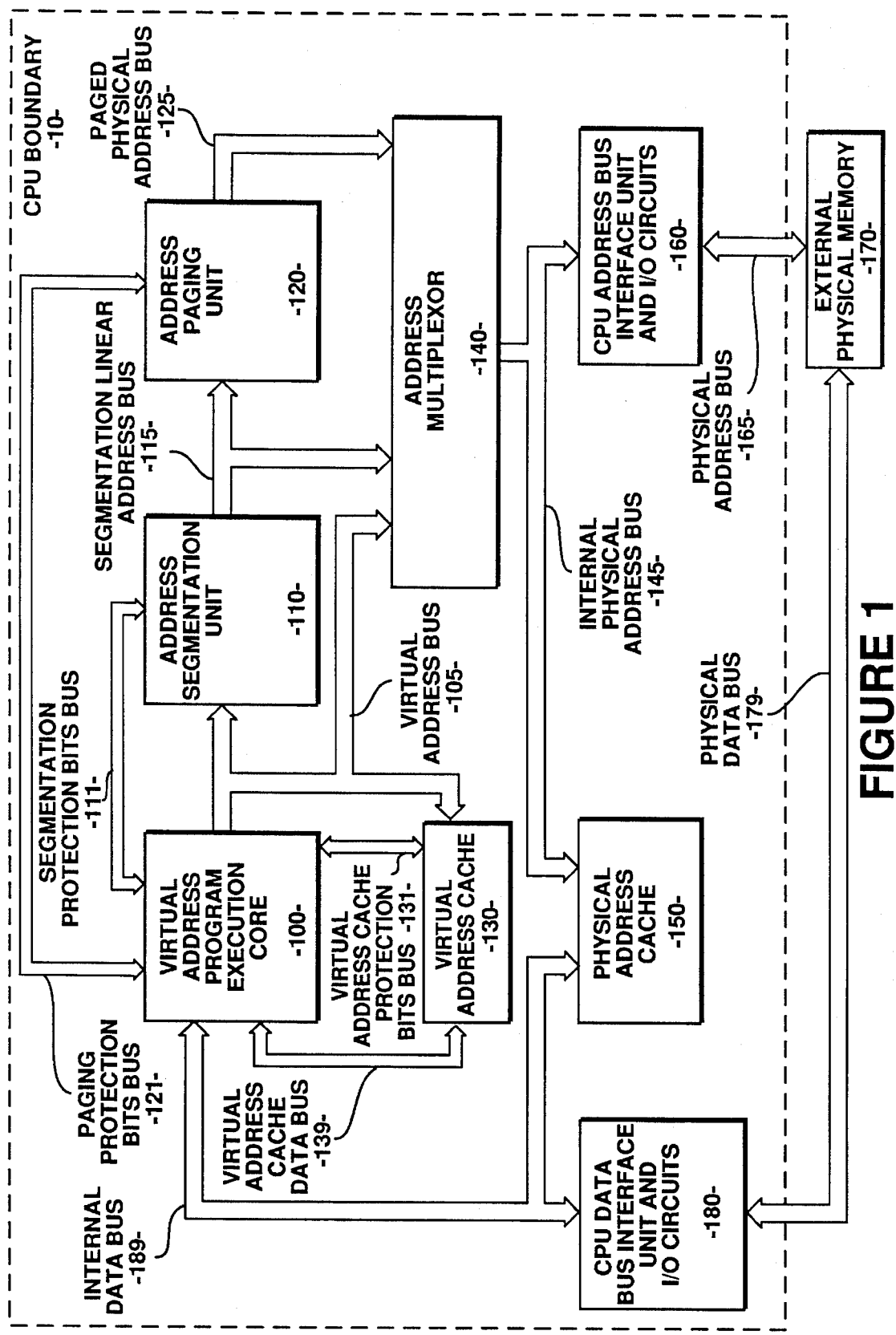
FIG. 1 is a block diagram of a portion of a computer system which includes a virtual address cache.
Figure 3:
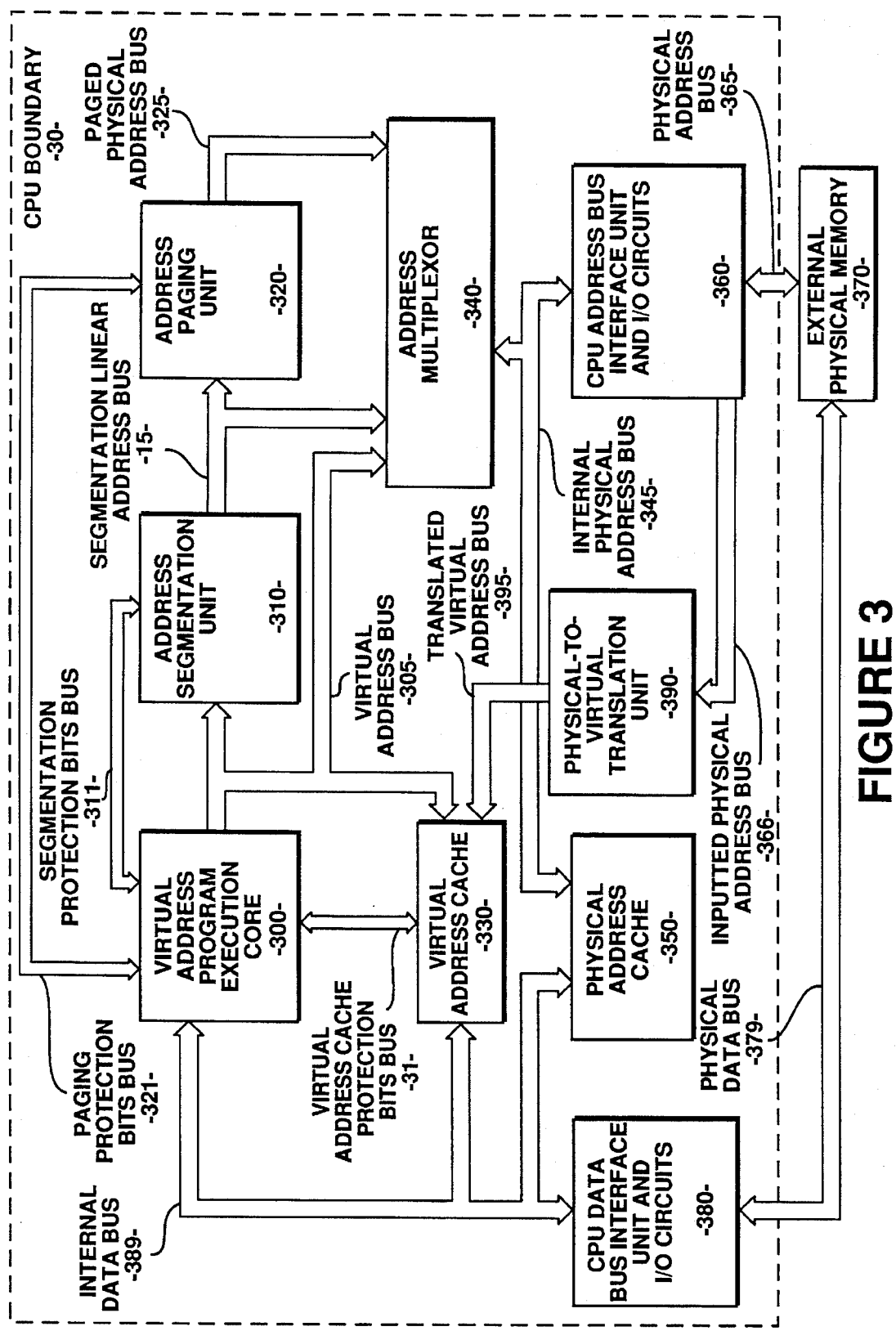
FIG. 3 is a block diagram of a portion of a computer system which includes a physical-to-virtual address translation block.

FIG. 1 illustrates a block level diagram of a portion of a computer system incorporating the present invention. The computer system of FIG. 1, includes a virtual address cache 130, a physical address cache 150, and an external physical memory 170. The virtual address program execution core 100 receives instructions or data from either virtual address cache 130, physical address cache 150, or external physical memory 170. Virtual address cache data bus 139 passes data between the program execution core 100 and virtual address cache 130. The internal data bus 189 is used to transfer data between program execution core 100, physical address cache 150, and the CPU data bus interface unit 180. Other embodiments (as shown in FIG. 3) combine the internal data bus 189 and the virtual address cache data bus 139 to a single shared bus.

Protection information associated with virtual address cached data is passed between the virtual address cache 130 and the program execution core 100 on the virtual address cache protection bits bus 131. In this way, data accessed from the virtual address cache 130 may have associated protection information delivered along with the data.

If the data desired by the program execution core 100 is not contained in the virtual address cache 130, a virtual-to-physical address translation (using the address segmentation unit 110 and/or the address paging unit 120) may be required. If the address segmentation unit 110 or address paging unit 120 are used to generate a physical address for the desired data, their respective segmentation protection bits bus 111 or paging protection bits bus 121 pass associated data protection information to the program execution core 100.

Most address segmentation units or address paging units contain protection information for only some of the memory segments or pages. Periodically, external physical memory is accessed to load the appropriate protection information for a new page or segment from an externally stored descriptor table. Some computer systems allow the internal data bus to write directly to a segmentation or paging unit to facilitate updating of protection information.

Virtual-to-physical address translation may be achieved in different ways. For example, FIG. 1 illustrates address multiplexor 140 accepting the addresses from the virtual address bus 105, the segmentation linear address bus 115, and the paged physical address bus 125. The address multiplexor 140 selects one of the addresses as the physical address to be delivered on the internal physical address bus 145.

With a physical address driven on the internal physical address bus 145, both the physical address cache 150 and CPU address bus interface unit 160 may begin their access cycles. Generally, a CPU executes a cache look-up simultaneously when beginning an I/O cycle. For a cache hit, the external I/O cycle is subsequently aborted.

Notice in FIG. 1 that the virtual address cache 130 interfaces with the program execution core 100, and bus 131 is employed for passing data protection information. Physical address cache 150 and external physical memory 170 do not require a similar interface, because the protection information for data in these locations is handled by the address segmentation unit 110 and address paging unit 120. Data protection information traditionally has been handled by the address segmentation and paging units in conjunction with the physical address. The present invention currently is implemented in consideration of virtual address caching. However, virtual addressing caches are not the only type of cache memory structures for which the present invention may be practiced.

Figure 2:
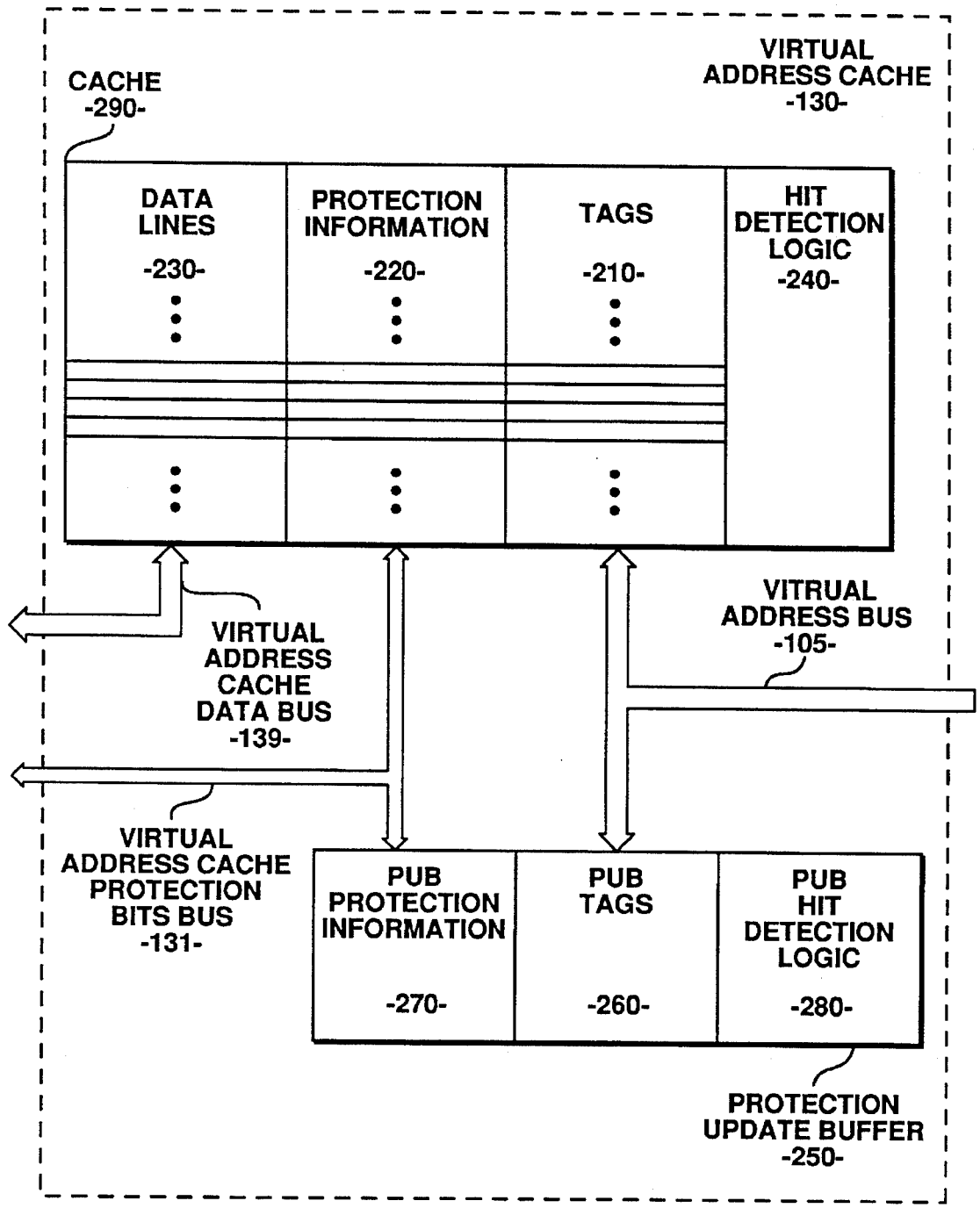
FIG. 2 is a block diagram of a cache of one embodiment of the present invention which includes a protection update buffer.

With reference to FIG. 2, there is shown one embodiment of the present invention comprising cache structure 290 including storage locations for data lines 230, associated protection information 220, and data line addresses or tags 210. In addition, FIG. 2 illustrates cache hit detection logic 240 and a protection update buffer 250 comprising hit detection logic 280, protection information 270, and PUB tags 280.

The protection update buffer (PUB) 250 works in conjunction with a cache memory that stores both data and protection information. PUB tags 260 may be different in length than the cache tags 210. The level of granularity for which protection information is managed in a computer is not generally as fine as the level of granularity used in managing the data itself. Data is often byte accessible from a cache structure, whereas a single set of protection information may correlate to an entire page or segment of memory. Differences in the level of granularity between data and protection information mean that PUB tags 260 may be different in length than cache tags 210. Variations in cache organization schemes between PUB 250 and cache 290 may also result in PUB tags 260 being shorter or longer than cache tags 210.

The PUB operates by storing updated protection information 270 associated with PUB tags 260. A PUB tag and protection information is stored in PUB 250 every time there is a data protection change in the computer system, unless adding a new PUB tag or associated protection information results in a overflow of PUB 250. Normally, for an overflow, cache 290 is flushed and the entries of the protection update buffer are cleared. PUB 250 generally stores information of multiple PUB tags. When a new data line is written to cache 290, no modification of PUB 250 is usually required.

When the program execution core 100 reads data from cache 130, the cache's tags 210 are checked for a hit. Simultaneously, the PUB tags 260 are also checked. If one of the cache tags 210 match the address on address bus 105, then cache 290 has a hit and data may be read from the appropriate data line in block 230 and associated protection information from block 220. However, for the present invention, before the associated protection information from block 220 is allowed to be passed out of the cache 130 on protection bits bus 131, the protection update buffer 250 is first checked for a match between the desired address on address bus 105 and the PUB tags 260. If a match is found with the PUB tags 260, then data in the PUB protection information block 270 should be used instead of protection information from block 220.

One of the ways that the present invention improves computer performance is by performing PUB tag look-ups and cache tag look-ups in parallel. This means that the presence of PUB 250 within the cache does not impact the speed of the data acquisitions. Note that for prior art approaches locking-out of cache addressing while checking all tag entries results in a performance penalty. The present invention, by reducing the locking-out of the cache, provides an opportunity for improved computer performance.

In another embodiment, when PUB protection block 270 is deleted, the present invention operates by invalidating a cache 290 hit when a corresponding match is found in the PUB tags 260. This embodiment of the present invention results in a smaller PUB structure than described above.

Figure 4:
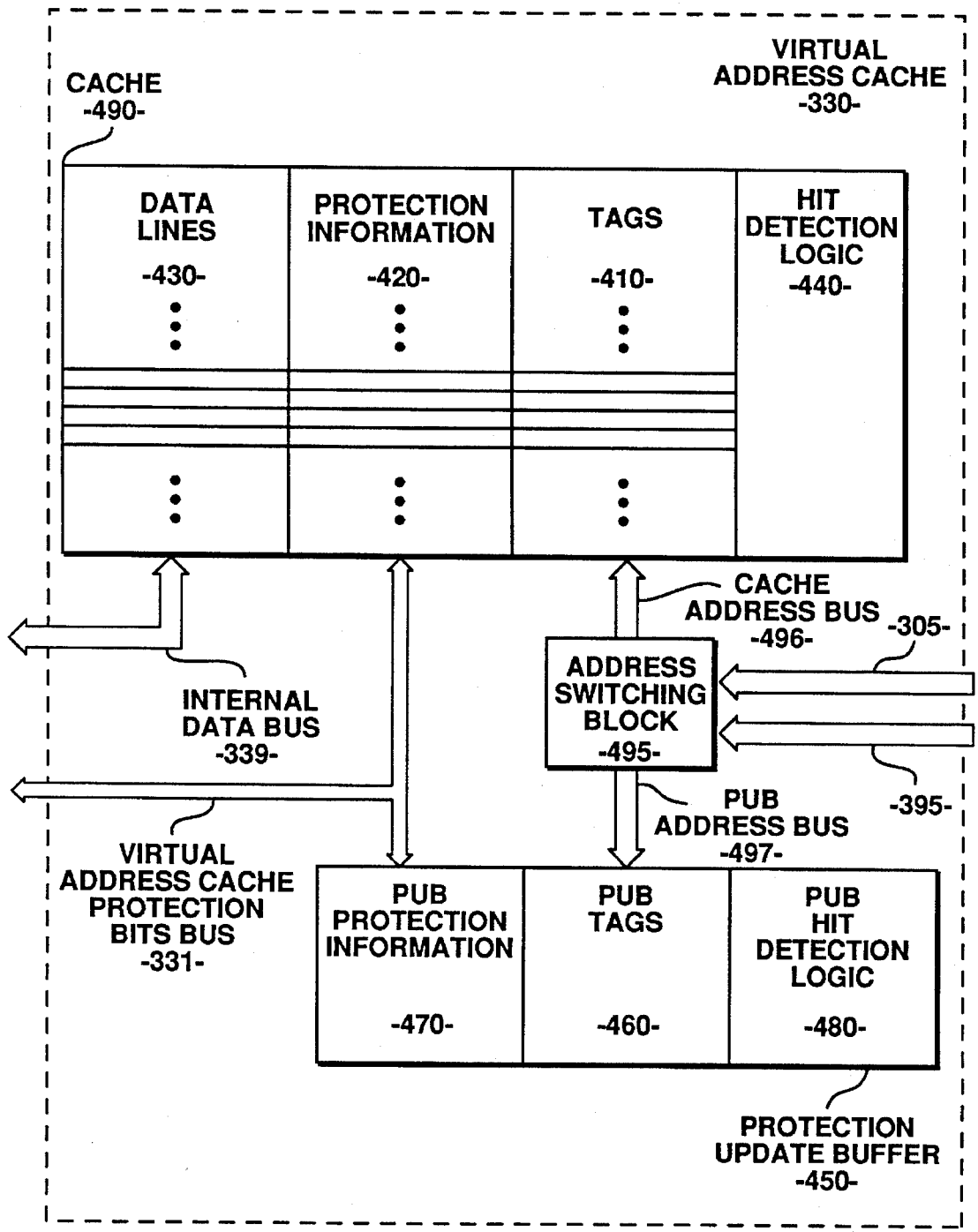
FIG. 4 is a block diagram of a cache of one embodiment of the present invention which includes a protection update buffer and two address input busses.

FIGS. 3 and 4 illustrate modifications and additional elements that are useful in practicing the present invention in a multiprocessor system. For a multiprocessor computer system, it is important for CPU 30 (FIG. 3) to snoop the physical data bus 379 and the physical address bus 365 to monitor the activity of other processors which may be changing data stored in the shared physical memory. In accordance with the present invention, detecting changes to the protection information of shared data is necessary. To achieve this requirement, the embodiment represented in FIGS. 3 and 4 includes a physical-to-virtual address translation unit 390. The address translation unit 390 converts the physical address input on bus 366 to a virtual address, and then delivers it on the translated virtual address bus 395 to the virtual address cache 330. In this way, virtual address cache 330 may add a new virtual tag address to the PUB when another processor changes protection information of shared data.

Notice in FIGS. 3 and 4 that two virtual address busses (305 and 395) provide inputs to virtual address cache 330. Having two input busses reduces the interference that adding a PUB tag causes with general cache 490 tag hit detection. Address switching block 495 for this embodiment is required for controlling when the PUB tags 460 are read from virtual address bus 305 for a normal cache look-up, verses when translated virtual address bus 395 is used for adding a cache tag to block 460 of PUB 450.

Figure 5:
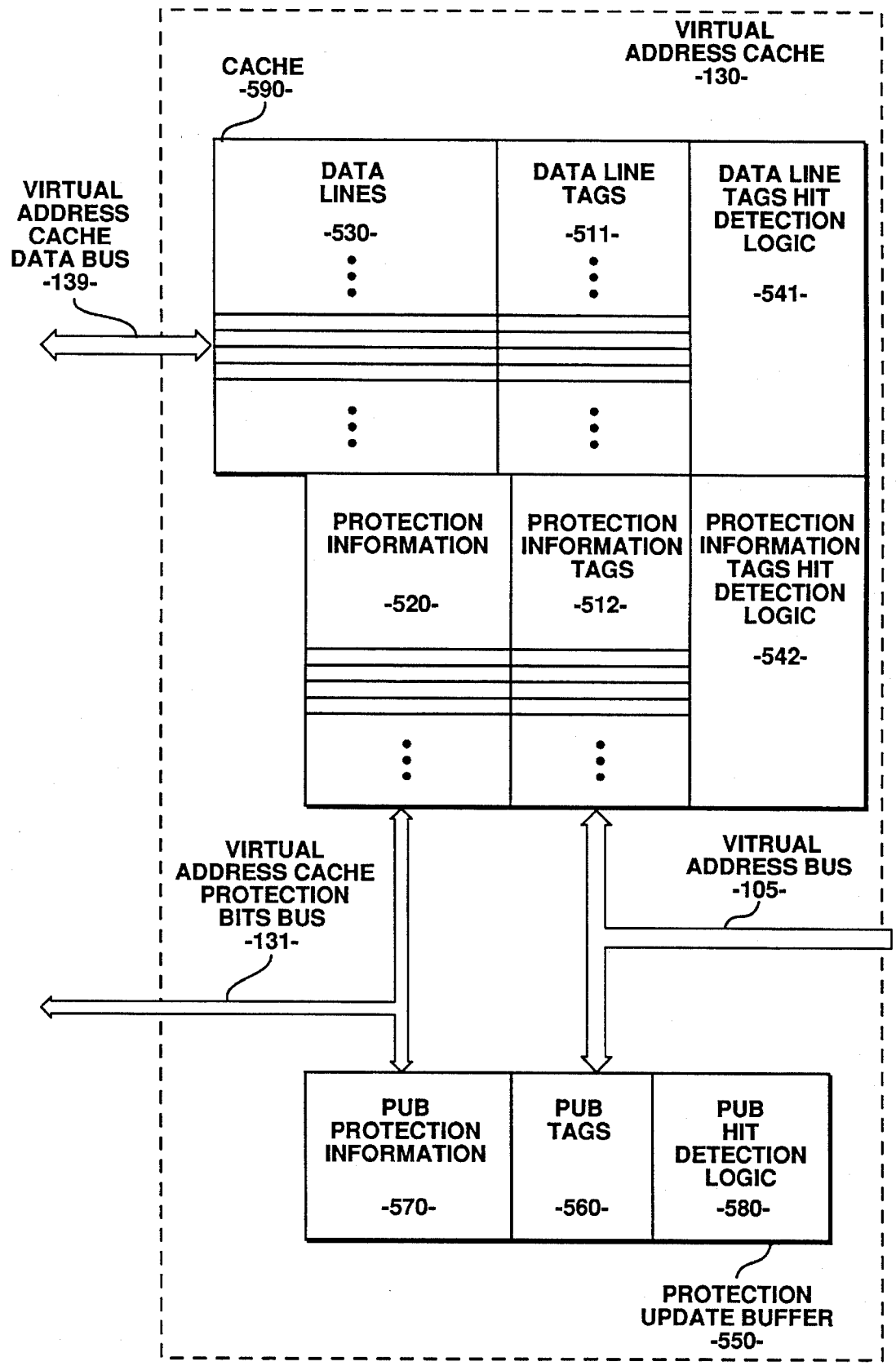
FIG. 5 is another embodiment of the present invention.

In another embodiment, differences in granularity between data and protection information is utilized for size improvement of the cache structure. FIG. 5 illustrates a cache block 590 developed with two tag sections: data line tags 511, and protection information tags 512. Protection update buffer 550 remains unchanged from the disclosure of the embodiment illustrated in connection with FIGS. 2 and 4. Data line tags 511 address corresponding data lines, and protection information tags 512 each address a corresponding set of protection information.

Having both data line tags 511 and protection information tags 512 as illustrated by FIG. 5 represents increased complexity over the embodiment illustrated by FIG. 2. However, using two sets of tags (511 and 512) instead of one (as illustrated by block 210 of FIG. 2) allows a smaller sized cache to do the job of and just as quickly as a larger cache. An opportunity for saving in cache area resulting in increased efficiency of circuit area utilization is obtainable utilizing an embodiment of the present invention similar to FIG. 5.

One final feature of the embodiment illustrated by FIG. 5 is mentioned. Notice as illustrated by FIG. 5, similar to the PUB tags, there is no constraint that the protection information tags 512 be the same length as the data line tags 511.

I claim:

1. An apparatus in an information processing hardware module comprising:

a cache for storing a plurality of address tags, a plurality of sets of data protection information, and a plurality of data lines;

a logic unit coupled to said cache, said logic unit for detecting a match between an address tag and an input address, said logic unit providing a first signal when said match is detected which enables said cache to output a portion of a data line and a set of data protection information; and a protection update buffer, coupled to said logic unit, said protection update buffer for storing a plurality of protection update buffer tags, and for providing a second signal to said logic unit, said second signal being in a predetermined state in response to said input address matching one of said plurality of protection update buffer tags, said second signal indicating said set of data protection information has been updated, said logic unit simultaneously checking for said matches between said input address, said address tags, and said protection update buffer tags.

2. An apparatus in an information processing hardware module, said apparatus comprising:

a cache for storing a plurality of address tags, a plurality of sets of data protection information, and a plurality of data lines;

a logic unit coupled to said cache, said logic unit for detecting a match between an address tag and an input address, said logic unit providing a first signal when said match is detected which enables said cache to output a portion of a data line and a set of data protection information; and a protection update buffer, coupled to said logic unit, said protection update buffer for storing a plurality of protection update buffer tags and a plurality of sets of update buffer protection information, and for providing a second set of data protection information in replacement of the set of data protection information in response to said input address matching a protection update tag, said second set representing the set of data protection information updated, and said logic unit simultaneously checking for said matches between said input address, said address tags, and said protection update tags.

3. An apparatus in an information processing hardware module comprising:

a virtual address cache for storing a plurality of virtual address tags, a plurality of sets of data protection information, and a plurality of data lines;

a logic unit coupled to said virtual address cache, said logic unit for detecting a match between a virtual address tag and an input virtual address, said logic unit providing a first signal when said match is detected which enables said virtual address cache to output a portion of a data line and a set of data protection information; and a protection update buffer, coupled to said logic unit, said protection update buffer for storing a plurality of protection update buffer tags, and for providing a second signal to said logic unit, said second signal being in a predetermined state in response to said input virtual address matching one of said plurality of protection update buffer tags, the second signal indicating the set of data protection information has been updated, said logic unit simultaneously checking for said matches between said input virtual address, said virtual address tags, and said protection update buffer tags.

4. An apparatus in an information processing hardware module, said apparatus comprising:

a virtual address cache for storing a plurality of virtual address tags, a plurality of sets of data protection information, and a plurality of data lines;

a logic unit coupled to said virtual address cache, said logic unit for detecting a match between a virtual address tag and an input virtual address, said logic unit providing a first signal when said match is detected which enables said virtual address cache to output a portion of a data line and a set of data protection information; and a protection update buffer, coupled to said logic unit, said protection update buffer for storing a plurality of protection update buffer tags and a plurality of sets of update buffer protection information, and for providing a second set of data protection information in replacement of the set of data protection information in response to said input virtual address matching a protection update tag, and said second set representing the set of data protection information updated, said logic unit simultaneously checking for said matches between said input virtual address, said virtual address tags, and said protection update buffer tags.

5. A method of operating a cache which includes a protection update buffer (PUB), comprising the steps of:

storing a cache tag address within said cache;

storing a data line within said cache;

storing a set of data protection information within said cache;

developing a set of stored cache tag addresses, a set of stored data lines, and a plurality of stored sets of data protection information;

checking each of said stored cached tag addresses for a first match with a desired address;

retrieving a corresponding data line and a corresponding set of data protection information when said match is detected;

saving a PUB tag address within said protection update buffer;

developing a set of stored PUB tag addresses;

checking every one of said set of stored PUB tag addresses for a second match with said desired address, said checking for said first and second matches are performed in parallel; and invalidating said corresponding set of data protection information in response to detecting said second match, wherein the second match indicates the set of data protection information has been updated.

6. A method of operating a cache which includes a protection update buffer (PUB), comprising the steps of:

storing a cache tag address within said cache;

storing a data line within said cache;

storing a set of data protection information within said cache;

developing a set of stored cache tag addresses, a set of stored data lines, and a plurality of stored sets of data protection information;

checking each of said stored cached tag addresses for a first match with a desired address;

retrieving a corresponding data line and a corresponding set of data protection information when said match is detected;

saving a PUB tag address within said protection update buffer;

saving a PUB set of data protection information within said protection update buffer;

developing a set of stored PUB tag addresses and a plurality of PUB sets of data protection information;

checking every one of said set of stored PUB tag addresses for a second match with said desired address, said checking for said first and second matches are performed in parallel; and overwriting said corresponding set of data protection information with a new set of PUB protection information in response to said second match being detected, said new set of PUB protection information representing the set of data protection information updated.

7. A method of operating a cache which includes a protection update buffer (PUB), comprising the steps of:

storing a cache tag address within said cache;

storing a data line within said cache;

storing a set of data protection information within said cache;

developing a set of stored cache tag addresses, a set of stored data lines, and a plurality of stored sets of data protection information;

checking each of said stored cached tag addresses for a first match with a desired address;

retrieving a corresponding data line and a corresponding set of data protection information when said match is detected;

saving a PUB tag address within said protection update buffer;

saving a PUB set of data protection information within said protection update buffer;

developing a set of stored PUB tag addresses and a plurality of PUB sets of data protection information;

checking every one of said set of stored PUB tag addresses for a second match with said desired address, said checking for said first and second matches are performed in parallel;

overwriting said corresponding set of data protection information with a new set of PUB protection information in response to said second match being detected, said new set of PUB protection information representing the set of data protection information updated; and invalidating said cache and clearing said protection update buffer when said saving steps cause an overflow of said protection update buffer.

8. An apparatus in an information processing hardware module, said apparatus comprising:

a first means for storing a set of cache lines, each cache line including a cache tag, a data byte and a set of protection information;

a second means for storing a protection update buffer tag;

a third means for checking stored cache tags of said set of cache lines for a match with a desired address;

a fourth means for checking stored said protection update buffer tag with said desired tag for a second match, the second match indicating the set of protection information has been updated, and said third and fourth means for checking performed in parallel;

a fifth means for delivering said data byte and said set of protection information when said third means detects said match and said fourth means does not detect said second match; and a sixth means for invalidating a cache line, said cache line one of said set of cache lines, when said third means detects said match and said fourth means detects said second match.

9. The apparatus defined in claim 8 wherein said protection update buffer tag includes a plurality of update buffer tags.

10. A computer system comprising:

a virtual address cache for storing a plurality of virtual address tags, a plurality of sets of data protection information, and a plurality of data lines;

a logic unit coupled to said virtual address cache, said logic unit for detecting a match between a virtual address tag and an input virtual address, said logic unit providing a first signal when said match is detected which enables said virtual address cache to output a portion of a data line and a set of data protection information; and a protection update buffer, coupled to said logic unit, said protection update buffer for storing a plurality of protection update buffer tags and a plurality of sets of update buffer protection information, and for providing a second set of data protection information in replacement of the set of data protection information in response to said input virtual address matching a protection update tag, said second set representing the set of data protection information updated said logic unit simultaneously checking for said matches between said input virtual address, said virtual address tags, and said protection update buffer tags.

11. The apparatus defined in either claims 1, 2, 3 or 4 wherein said information processing hardware module is a central processing unit.

12. The apparatus defined in either claims 1, 2, 3 or 4 wherein said information processing hardware module is a single chip microprocessor.

13. The apparatus defined in either claims 1, 2, 3 or 4 wherein said plurality of protection update buffer tags corresponds to a single protection update buffer tag.

14. The apparatus defined in either claims 2 or 4 wherein said plurality of sets of update buffer protection information corresponds to a single set of update buffer protection information.

15. The apparatus defined in either claims 1, 2, 3 or 4 wherein said portion of a data line corresponds to a whole data line.

* * * * *